United States Patent [19]
Miller

[11] B 3,995,315

[45] Nov. 30, 1976

[54] AUDIO CIRCUIT WITH NOISE MUTING FEATURE

[75] Inventor: Charles William Miller, Village of Inver Grove Heights, Minn.

[73] Assignee: Minnesota Mining and Manufacturing Company, St. Paul, Minn.

[22] Filed: Oct. 4, 1973

[21] Appl. No.: 403,477

[44] Published under the second Trial Voluntary Protest Program on February 3, 1976 as document No. B 403,477.

[52] U.S. Cl. .................................. 360/80; 360/67
[51] Int. Cl.² ........................................ G03B 31/00
[58] Field of Search ............... 360/80, 3, 19, 62, 69, 360/61, 67, 79

[56] References Cited
UNITED STATES PATENTS

| | | | |
|---|---|---|---|
| 2,633,055 | 3/1953 | Badmaieff | 360/3 |
| 3,334,194 | 4/1967 | Chang | 360/69 |
| 3,591,730 | 6/1971 | Chang | 360/61 |
| 3,673,345 | 6/1972 | Ban | 360/74 |
| 3,705,272 | 12/1972 | Tsuji et al. | 360/62 |
| 3,712,961 | 1/1973 | Nye et al. | 179/100.1 DR |
| 3,721,774 | 3/1973 | Yonemoto et al. | 360/61 |

*Primary Examiner*—James W. Moffitt
*Attorney, Agent, or Firm*—Alexander, Sell, Steldt & DeLaHunt

[57] ABSTRACT

An audio-visual slide projector having audio circuitry that is formed of a muting circuit and a record-reproduce circuit for the recording and playback of magnetic recording strips on a slide frame. The muting circuit is connected to the drive motor powering the slide changing apparatus of the projector and is energized during each slide change cycle to mute the record-reproduce circuit of the projector, thus, preventing noise from being applied to the output of the audio circuit.

5 Claims, 2 Drawing Figures

AUDIO CIRCUIT WITH NOISE MUTING FEATURE

BACKGROUND OF THE INVENTION

1. Field of the Invention

The present invention relates in general to audiovisual slide projectors and more specifically to the muting of the audio output of such projectors during each slide change cycle.

2. Description of the Prior Art

The broad concept of the use of a muting circuit in magnetic playback or recording equipment is old as illustrated by U.S. Pats. to Ban, No. 3,673,345, and Tsuji, No. 3,705,272. The Ban patent discloses a muting circuit that acts on the output amplifier circuit of a magnetic tape player to disable the power therefrom when the player is switched from a normal to a fast tape drive condition. The Tsuji patent teaches a muting circuit coupled to a high frequency biased record-reproduce system to interrupt the high frequency biasing signal during the interval while the system is being switched from a record mode to a reproduce mode. In this way, noise is eliminated that normally would be present as a side effect of the high frequency biasing signal.

Both of the above described muting circuits achieve the goal of eliminating noise from magnetic record-reproduce devices. However, both systems add to the complexity of the devices on which they are employed since they include switching apparatus that would otherwise not be needed. The present invention provides a muting circuit that is relatively simplistic in nature and as such adds no switching apparatus to the basic circuitry of the device on which it is employed.

SUMMARY OF THE INVENTION

The present invention provides a muting circuit for a slide projector having a record-reproduce circuit for the recording and playback of magnetic recording strips on a slide frame. The muting circuit is connected to the drive motor powering the slide changing apparatus of the projector and serves to mute the record-reproduce circuit during each slide change cycle.

In a preferred embodiment the record-reproduce circuit includes an input circuit, a preamplifier, an output amplifier, an automatic record level circuit and an output circuit. The automatic record level circuit includes a transistor stage that is connected between the output of the preamplifier and ground. The muting circuit of the present invention connects the base of this transistor stage and the negative side of the electrical circuit for the motor driving the slide changing apparatus of the projector. When the slide change motor is energized, a negative voltage is applied to the base of the automatic record level transistor stage, biasing it in a saturated condition whereby the output of the preamplifier circuit is shorted to ground. Thus, any noise that is developed in the preamplifier circuit during each slide change cycle is prevented from reaching an output amplifier circuit fed by the preamplifier circuit.

The foregoing and other advantages of the present invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figure 1:
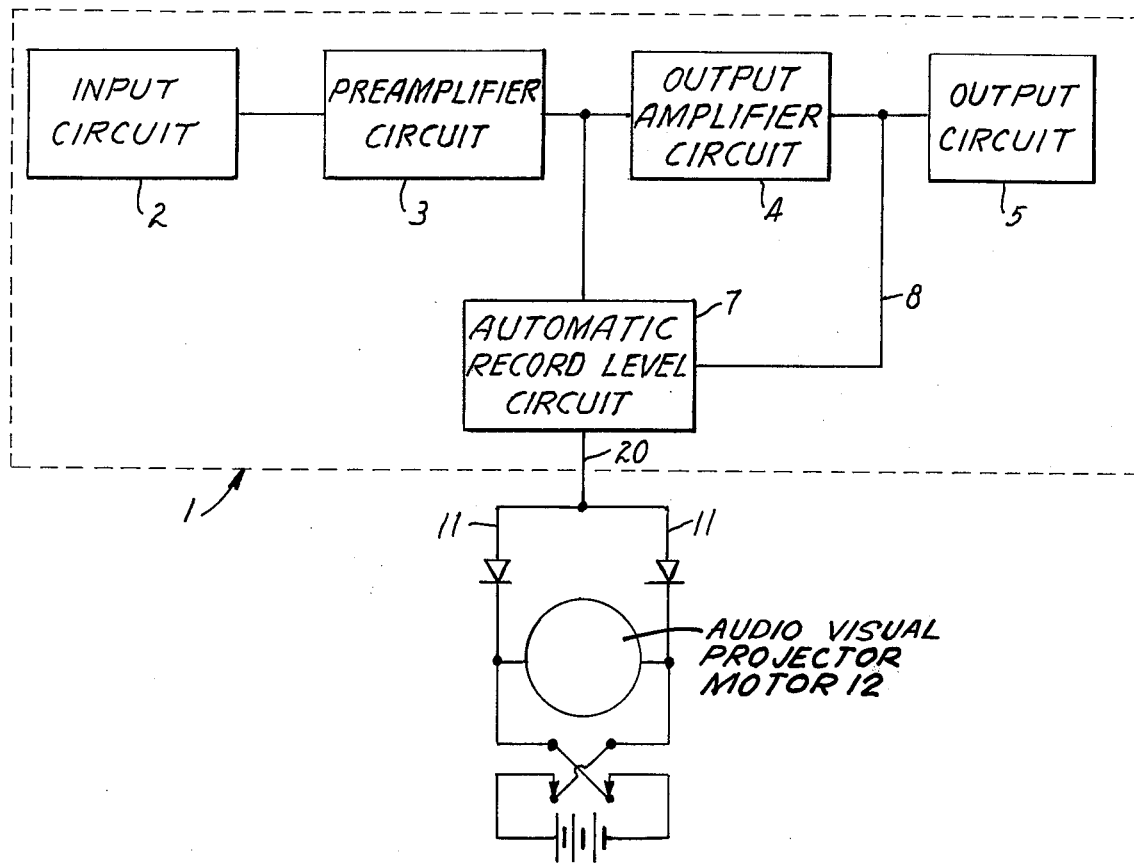
FIG. 1 is a block diagram of a conventional magnetic tape record-reproduce circuit together with a muting circuit of the present invention and a motor for an audiovisual slide projector.

Referring now to the drawings, FIG. 1 illustrates a block diagram of a standard magnetic tape record-reproduce circuit 1 including an input circuit 2, a preamplifier circuit 3, an output amplifier circuit 4, an output circuit 5, and an automatic audio record level circuit 7 connected to the output of the preamplifier circuit 3. The input circuit 2 includes a microphone and a playback head (both not shown) for respectively transforming sound waves and magnetic variations stored on magnetic media into electrical signals. Such signals are applied to the input of the preamplifier circuit where they are highly amplified and then fed from the output of the preamplifier circuit 3 to the output amplifier circuit 4 for additional amplification. From the output of the amplifier circuit 4 the signals are next conducted to an output circuit 5 that includes a speaker and a record head (both not shown) that are alternatively employed depending on whether the record-reproduce circuit 1 is in a reproduce or record mode. A portion of the output of the amplifier circuit 4 is also fed to the automatic record level circuit 7 via a line 8, and when the circuit 1 is in a record mode the record level circuit 7 shunts a portion of the preamplifier output to ground so as not to exceed a predetermined record level.

The above described record-reproduce circuit 1 is normally used in a wide variety of magnetic tape equipment, but is shown in FIG. 1 together with a muting circuit comprising a pair of lines 11 that electrically connect between each side of the electrical circuit for a motor 12 and the automatic record level circuit 7 to form with the circuit 1 the audio circuitry of a preferred embodiment of the present invention. The motor 12 serves to drive the slide changing apparatus of an audio-visual slide projector described as in U.S. application No. 260,184 filed June 6, 1972, now U.S. Pat. No. 3,876,297 entitled "Slide Identification", assigned to the assignee of the present invention. The muting circuit is employed to shunt the output of the preamplifier 3 during each slide change cycle to substantially eliminate unwanted noise generated by the motor 12. However, it is not essential that the muting circuit of the present invention be employed solely in audio-visual slide projectors for it may be advantageously employed with record-reproduce systems of other equipment having unwanted electrical noise sources that generate noise at intervals when the audio circuitry of the equipment is not needed.

The lines 11 of the muting circuit each include a diode 13 to apply any negative voltage present at either side of the motor 12 to the automatic record level circuit 7. Two lines 11 are employed because the motor 12 is reversible and, accordingly, negative voltage may be applied to either side of the motor. If the motor 12 was not reversible, only one line 11 connected to the negative side of the motor 12 would be required.

Figure 2:
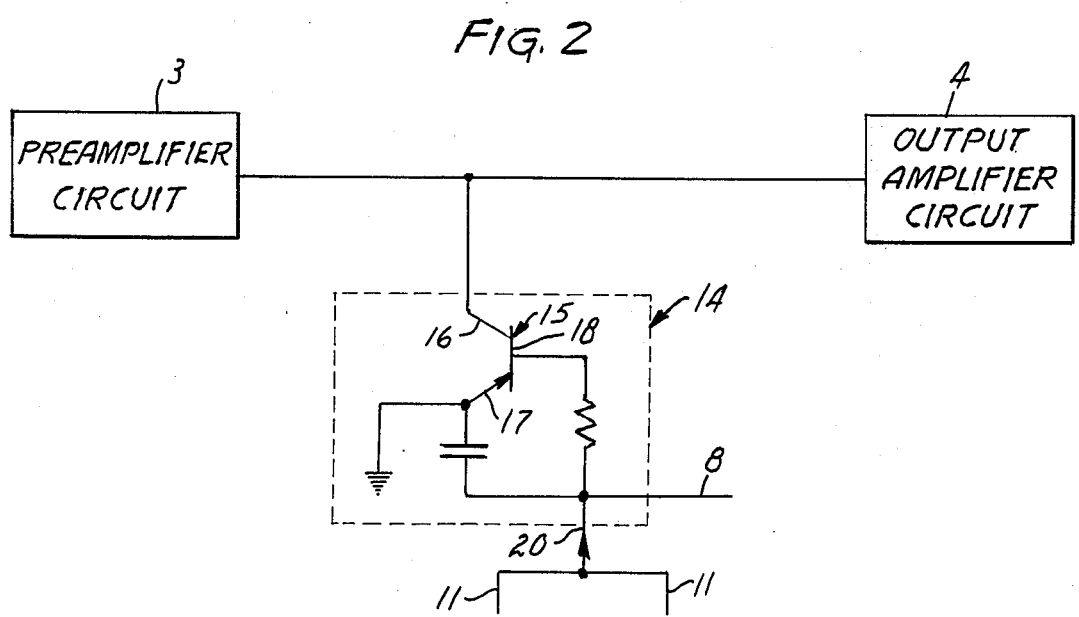
FIG. 2 illustrates one transistor stage of an automatic record level circuit of FIG. 1 in schematic form together with the preamplifier circuit, the output amplifier circuit and portions of the muting circuit of FIG. 1.

Referring now to FIG. 2, a transistor stage 14 of the record level circuit 7 is schematically illustrated. The stage 14 includes a PNP transistor 15 having a collector 16 connected to the output of the preamplifier circuit 3, an emitter 17 connected to ground and a base 18 connected to both the feedback line 8 coming from the output amplifier circuit 4 and a line 20 that joins the lines 11 of the muting circuit. In normal reproduce operation of the circuit 1, the transistor 15 is turned off and does not shunt any of the preamplifier output from the input of the output amplifier 4.

When the record-reproduce circuitry 1 is operated in a record mode, negative feedback is fed to the base of the transistor 15 via the line 8 to bias the transistor 15 into a conductive state corresponding to a desired record level selected. During each slide change cycle, negative D.C. voltage for driving the motor 12 is applied to the base 18 of the transistor 15 to bias the same in a saturated state, whereby substantially all of the preamplifier output is shunted to ground through the transistor 15. Accordingly, at such time, the preamplifier circuit 3 is muted and does not pass noise on to the output amplifier 4.

As previously discussed, the purpose of shunting the preamplifier 3 is to eliminate noise in the record-reproduce circuit 1 during the change cycle of the projector. The main source of such noise is the motor 12 that produces RF noise when it is energized. This RF noise is picked up by the input of the preamplifier 3 and although the level of such noise is initially quite low the high-gain of the preamplifier 3 substantially boosts the level of the RF noise. If the output of the preamplifier 3 is not shunted, the amplified noise is applied to the output amplifier 4 and is amplified even further. The end result is an annoying unwanted noise during each change cycle.

Thus, by the employment of the audio circuitry comprising the lines 11, and the record-reproduce circuit 1, each time the motor 12 is actuated during a slide change cycle, the transistor 15 is turned full on to a saturated conductive state to mute the record-reproduce circuit 1. This result is inexpensively and reliably achieved without the addition of switching elements extraneous to the circuitry 1.

What we claim is:

1. An audio circuit for use with a device having an electrically actuated noise generating source that produces electrical noise during intervals when no desired audio signal is being processed, which audio circuit contains a transistor stage connected between an amplifier portion of the audio circuit and an electrical ground, wherein the improvement comprises:
   muting circuitry for connecting the transistor stage to the electrical power actuating said noise generating source so that when said noise source is electrically actuated an electrical signal is also provided to said transistor stage during and only during the application of electrical power to said noise generating source, which electrical signal is provided only during the generation of noise by said noise source to switch the transistor stage and shunt the amplifier to ground through said transistor stage, thereby muting said electrical noise in the audio circuit.

2. An audio circuit as recited in claim 1 and further including an output amplifier circuit, a preamplifier circuit for feeding a signal to said output circuit, and an automatic record level circuit electrically connected to the output of the preamplifier circuit, which record level circuit includes the transistor stage that is electrically connected to the power actuating said noise source by said muting circuitry.

3. An audio-visual media presentation device in which electrical noise is generated by electrically actuated apparatus for transporting the media during intervals when no desired audio signal is being processed, which device includes an audio circuit containing a transistor stage connected between an amplifier portion of the audio circuit and an electrical ground, wherein the improvement comprises:
   muting circuitry for connecting the transistor stage to the electrical power actuating the electrical noise generating apparatus so that when said noise apparatus is actuated an electrical signal is provided to said transistor stage during and only during the application of electrical power to said noise generating apparatus, which electrical signal is also provided only during the generation of noise by said noise apparatus to switch the transistor stage and shunt the amplifier portion to ground through said transistor stage, thereby muting said electrical noise in the audio circuit.

4. An audio-visual media presentation device having an electrically driven motor for propelling a media transporting apparatus of the device, an electrical circuit for powering said motor, and an audio circuit for the processing of an audio signal, said audio circuit comprising:
   an output amplifier circuit;
   a preamplifier circuit for feeding a signal to said output amplifier circuit;
   an automatic record level circuit including a transistor stage for normally shunting a portion of the output of said preamplifier circuit to ground during a record mode of said audio circuit to maintain a predetermined record level; and
   muting circuitry electrically connecting the electrical circuit for said motor with the record level circuit for actuating said transistor stage to shunt the output of the preamplifier circuit to ground through said transistor stage during and only during application of electrical power to the motor propelling the media transporting apparatus.

5. A presentation device as recited in claim 4 wherein said muting circuitry includes a lead connecting between one side of the electrical circuit for said motor and the base of the transistor in said transistor stage so that when a voltage is applied to said side of the electrical circuit for said motor, said transistor is energized to a saturated condition.

* * * * *